Sept. 8, 1953

W. S. McGOWAN 2,651,405

TRANSPLANTING MACHINE

Filed Sept. 22, 1948

INVENTOR
Wm. S. McGowan

ATTORNEYS

Sept. 8, 1953 W. S. McGOWAN 2,651,405
TRANSPLANTING MACHINE
Filed Sept. 22, 1948 2 Sheets-Sheet 2

INVENTOR
Wm. S. McGowan
BY
ATTORNEYS

Patented Sept. 8, 1953

2,651,405

UNITED STATES PATENT OFFICE 2,651,405

TRANSPLANTING MACHINE

William S. McGowan, Torreon, Mexico

Application September 22, 1948, Serial No. 50,455

1 Claim. (Cl. 198—179)

1

This invention is directed to a transplanting machine of that type which includes an endless driven chain disposed in a vertical plane lengthwise of the machine, and a plurality of plant holding units mounted on the chain and adapted to be loaded by an operator when such units are disposed in one position on the chain, and to discharge the plants to the ground when the units are in another position on the chain.

The major object of the invention is to mount the chain on the machine so that such chain includes a lower rearwardly traveling portion following said lower portion; to pivotally mount the units on the chain so that said units lie flat against the inclined portion of the chain for convenient loading and will hang down from the lower portion of the chain for discharge of the plants to the ground, and to provide a means between the units and the chain mounting means so that the units will be automatically restored to a flat position when they reach the upwardly sloping portion of the chain.

A further object of the invention is to provide a transplanting machine which will be exceedingly effective for the purpose for which it is designed.

These objects are accomplished by means of such structure and relative arrangement of parts as will fully appear by a perusal of the following specification and claims.

Figure 1:
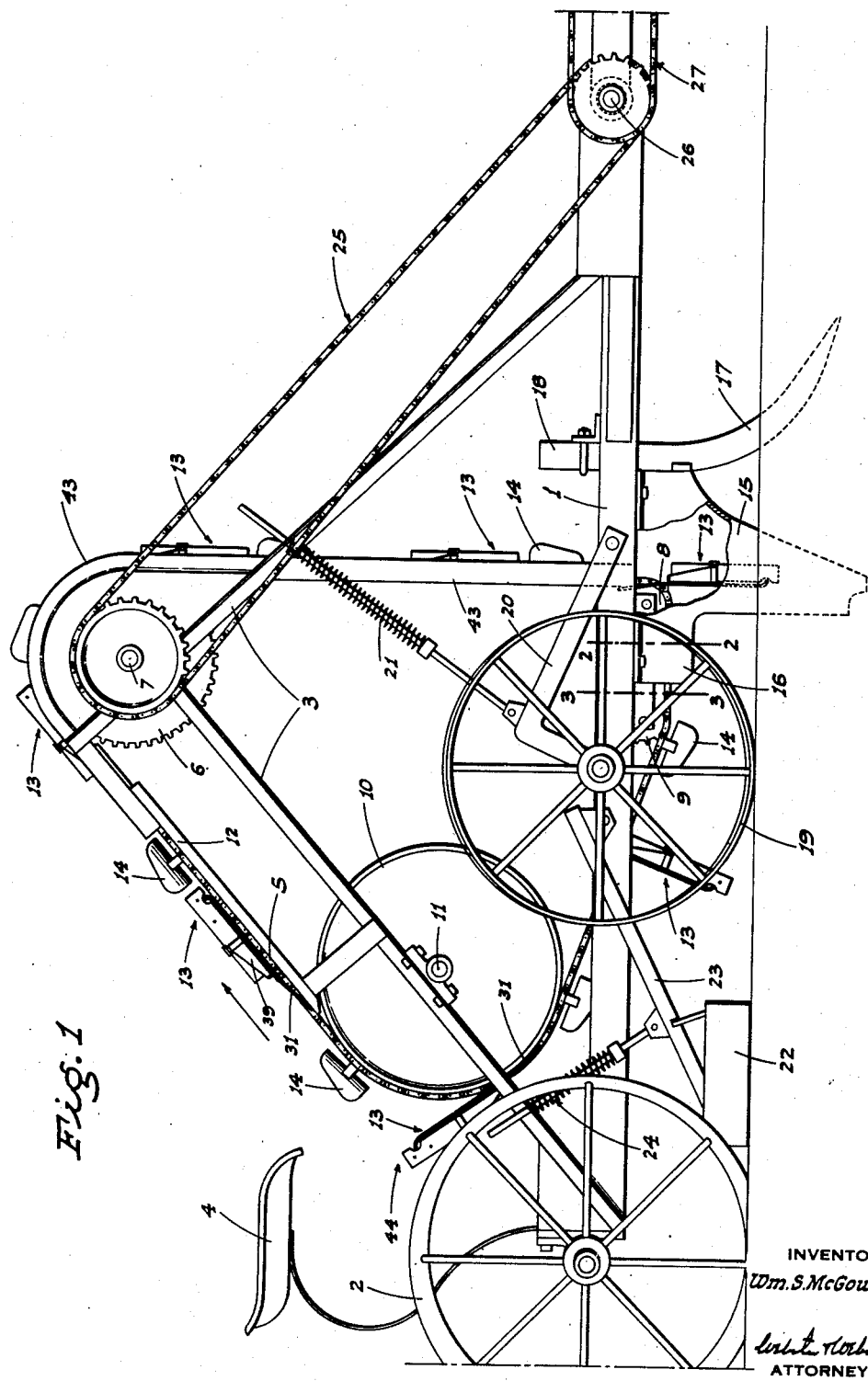
Fig. 1 is a side elevation of the machine as in use.

Referring now more particularly to the characters of reference on the drawings, the transplanting machine comprises a longitudinal main frame 1 disposed above the ground for movement therealong; such main frame 1 being supported at its rear end by transversely spaced wheels 2. At its forward end the frame 1 is adapted to be connected in supporting and draft relation to a tractor by means of a hitch (not shown).

Intermediate its ends the longitudinal main frame 1 includes a generally triangular, upstanding supporting frame 3, and rearwardly of said frame 3 the main frame 1 is fitted with an operator's seat 4. An endless chain 5 is supported from the frame 3, as follows:

At the top of the frame 3 there is a large sprocket 6 on a cross shaft 7; the chain 5 running over the top of the sprocket 6 and then depending vertically and turning rearwardly about a small sprocket 8 fixed in connection with the main frame 1. From the sprocket 8 the chain 5 runs straight or horizontally in a rearward direction to and about, from below, another small sprocket 9, likewise fixed in connection with the main frame 1. After leaving the small sprocket 9, the chain 5 runs at an upward and rearward incline, and thence passes about the rear of a relatively large-diameter, flat faced pulley 10 on a cross shaft 11 journaled in connection with the frame 3. Adjacent, but short of, the top of the pulley 10 the chain leads off the same tangentially and at a forward and upward incline; being supported, for the main portion of its length, between pulley 10 and sprocket 6 by a longitudinal platform 12 included in said frame.

The chain 5 is fitted, on the outside and at equally spaced longitudinal points, with a plurality of plant holding units, each of which is indicated generally at 13, and hereinafter described in detail.

The plant holding units 13 are each led, on the chain 5, by an outwardly opening, longitudinal cradle 14 affixed to said chain.

The loading station for the plant holding units 13 is at that portion of the chain which runs on the longitudinal platform 12; i. e. directly ahead, and within manual reach, of the operator on the seat 4.

The chain 5, plant holding units 13, and leading cradles 14 enter, as they turn about the sprocket 8, a hollow, furrow forming shoe 15 fixed in connection with, and depending from, the main frame 1; such shoe being open at the rear and including transversely spaced sides 16 intermediate which the straight portion of the chain between sprockets 8 and 9 runs. The hollow, furrow forming shoe 15 is led by a ripper tooth 17 fixed by a standard 18 to the main frame 1. Directly rearwardly of the shoe 15 the machine includes, on opposite sides of the main frame 1, a pair of transversely spaced, furrow closing wheels 19 mounted on vertically swingable, L-shaped draft arms 20 which are yieldably spring-pressed in a downward direction by corresponding spring units 21.

Between the furrow closing wheels 19 and the wheels 2, the machine includes, in ground engagement and on opposite sides of the furrow line, a pair of rearwardly converging scraper blades 22 fixed in connection with pivotally mounted draft arms 23 which are yieldably spring-pressed downwardly by spring units 24.

The furrow closing wheels 19 preferably are canted inwardly at the bottom, whereas the wheels 2 not only cant in at the bottom, but converge rearwardly slightly; such latter wheels being the final furrow closing and presser wheels of the machine.

The endless chain 5 is driven, in the direction indicated by the arrow in Fig. 1, by means of an endless chain and sprocket unit 25 connected between the cross shaft 7 and a countershaft 26 on the main frame 1 adjacent its forward end. The countershaft 26 is driven by an endless chain and sprocket unit 27 which derives its movement from the power take-off shaft or the like (not shown) of the tractor.

Each of the plant holding units 13 comprises the following structural arrangement:

The numeral 28 indicates a flat longitudinal base plate formed, at its trailing end, with transversely spaced, projecting attachment ears 29 which are adapted to pivotally connect to an attachment link 30 of the chain 5, with said plate 28 initially (i. e. at the loading station) extending forwardly from said ears. At its rear or trailing end 29 the plate 28 includes a pair of transversely spaced control fingers 31 which project rearwardly in rigid relation on opposite sides. From a point adjacent but ahead of the ears 29, and resting on the outer face of the plate 29, the latter is provided with a spring steel grip 32 of elongated, generally U-shape; such grip being formed of a relatively thin spring steel strap disposed edgewise, as shown, and anchored, as at 33, to the plate 28.

The spring steel grip 32 is quite flexible, and includes forwardly projecting jaws 34 normally spaced apart in parallel relationship, and projecting slightly beyond the forward end of the plate 28. Separation of the jaws 34 of grip 32 beyond parallelism is prevented by a pair of outwardly projecting, transversely spaced pins 35 on the plate 28, which pins lie outside the grip 32 intermediate its ends. The pins 35 are connected, at their outer ends, by a cross strap 35a, which assures that the jaws 34 cannot be accidentally deflected away from the plate 28.

The jaws 34 are faced, on adjacent sides, with a resilient pad 36, such as a strip of rubber, which strip is continuous and includes an end loop 37 some distance rearwardly of the free ends of the jaws 34.

Grip actuating levers 38 are pivoted to the pins 35 and extend rearwardly exteriorly of, and along, the corresponding sides of the grip 32 for a certain distance, and thence said levers include rearwardly and outwardly diverging legs 39.

Figure 2:
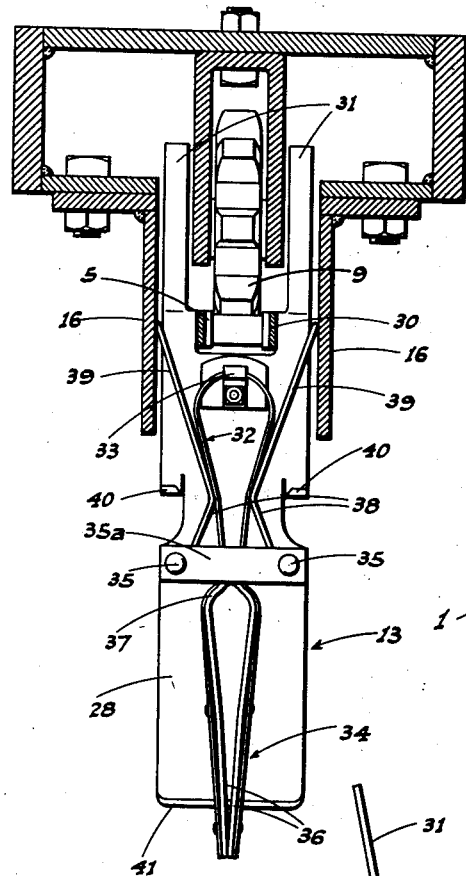
Fig. 2 is an enlarged cross section on line 2—2 of Fig. 1.
Figure 3:
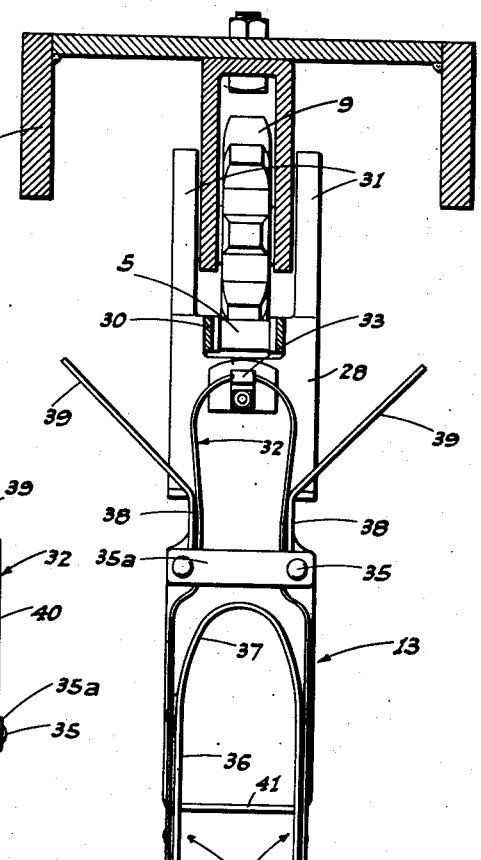
Fig. 3 is an enlarged cross section on line 3—3 of Fig. 1.
Figure 4:
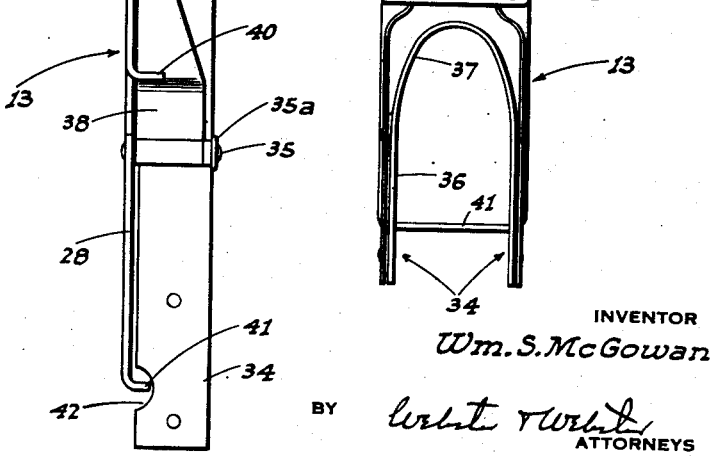
Fig. 4 is a side elevation of one of the plant holding units, detached.

The jaws 34 are in their parallel open position when the legs 39 are free, as in Fig. 3. However, upon mechanical swinging of the legs 39 inwardly, i. e. toward each other in the manner hereinafter described, the jaws 34 are caused to close in the manner shown in Fig. 2; the jaws when closed engaging only at their tip portions, by reason of the fact that said jaws are then converging lengthwise of the direction of travel. This convergence is brought about by virtue of the fact that the grip actuating levers 38 when swung inwardly by the legs 39 ride the sides of the grip 32 intermediate its ends.

Outturned stops 40 on the plate 28 prevent the grip actuating levers 38 from separating, or swinging laterally outward beyond a predetermined point.

At its forward end the base plate 29 includes an outturned, plant supporting lip 41; the jaws being notched, as at 42, to clear such lip.

When the planting machine is in operation, each plant holding unit 13 is in a free or released position when it runs with the chain 5 up the longitudinal platform 12. At this time the operator, from the seat 4, places a plant between the jaws 34 of each unit 13, with the stem resting on the lip 41 and with the roots seated in the corresponding and leading cradle 14.

As the loading station, i. e. the longitudinal platform 12, is of substantial length, an operator is not pressed for time when depositing plants in the holding units 13; the arrangement of the units 13 and cradles 14 being such that the operator does not have to hold onto the plant until the plant holding unit closes in plant gripping relation. Further, the length of platform 12 permits, if necessary, more than one man to work at the loading station.

As each unit 13 approaches the sprocket 6 and runs off the platform 12, such unit passes into a channel 43 symmetrical to and enclosing the chain from the upper end of said platform 12 to a point closely adjacent the small sprocket 8. When each unit 13 is in the channel 43, the sides of such channel are in engagement with the legs 39, swinging the same laterally inwardly whereby to cause the actuating levers 38 to compress the grip 32 intermediate its ends, with resultant closing of the jaws 34 on the supported plant. Thus, as each unit 13 traverses the sprocket 6 and travels downwardly to the shoe 15, the unit is closed or in plant gripping relation, preventing the plant from falling or escaping.

For proper operation, the outer and trailing ends of the legs 39, when riding in channel 43, should be substantially transversely alined with the corresponding attachment ears 29. Further, the legs 39 and the control fingers 31, riding in the channel 43 on the downward course between sprockets 6 and 8, tend to hold the units perpendicular in said channel, as desired.

The sides 16 of the hollow, furrow forming shoe 15 are in effect continuations of the sides of the channel 43, so that as each plant holding unit 13 passes about the sprocket 8 and travels with the straight portion of the chain 5 between said sprocket 8 and the sprocket 9, said sides 16 continue to hold the unit 13 closed. Each unit, as it reaches the sprocket 8, and traverses between the latter and the sprocket 9, is in a dependent vertical position, as in Fig. 1. As the machine advances, the ripper tooth 17 loosens the ground and, immediately following, the hollow shoe 15 forms a furrow into which each plant holding unit 13 depends between the sprockets 8 and 9.

As the plant holding units 13 are perpendicular when they enter the shoe 15, such shoe is much shorter than otherwise would be necessary to permit the units 13 to move, as an arc, into the shoe.

As each plant holding unit 13 reaches the rear ends of the sides 16 of shoe 15, the divergent legs 39 spring clear of such sides, whereupon the jaws 34 spring open, dropping the plant into the furrow rearwardly of the working portion of the shoe 15.

The wheels 19 impose an initial earth packing action about the roots of each plant in the furrow, which is followed by earth being scraped into the furrow by the blades 22. Finally, the wheels 2 impose the final packing action on the then filled furrow to assure of firm setting of each plant.

After each plant holding unit 13 has dropped its plant into the furrow, such holder moves toward the pulley 10, remaining in a generally dependent position. However, as soon as the unit 13 arrives at the pulley 10, the rearwardly projecting control fingers 31 are brought to bear against the flat face of said pulley 10, immediately swinging the corresponding unit 13 to a position of tangency, as at 44. This position of tangency continues until the unit 13 runs off the pulley 10 adjacent its top, at which time gravity holds the unit lengthwise in engagement with the chain 5 for its next passage up the platform 12.

The cradles 14 are of a width so that they have no obstruction as they travel with the chains, passing freely within the channel 43 and between the sides 16 of the shoe 15.

As the furrow closing wheels 19 and scraper blade 22 are spring-pressed they follow ground contour at all times, so that their action is always effective.

The described transplanting machine is a practical and reliable apparatus for the planting of row crops with the plants spaced apart equally and a predetermined distance.

While especially for the planting of guayule, obviously the machine may be used for other types of crops, such as tomatoes, etc.

The particular design of each plant holding unit 13 is of advantage for the reason that the plants as gripped between the jaws 34 are not damaged. This is by virtue of the fact that the grip 32 is elongated, with relatively flexible jaws 34; the closing action being imparted not directly to said jaws 34, but at a point intermediate the ends of the grip. The resilient pad 36 also assures against stem or foliage compression to the point of damage.

The pad 36, and end loop 37, soften the gripping action of the jaws, and additionally each loop 37 forms a plant locator and stop.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claim.

Having thus described the invention, the following is claimed as new and useful, and upon which Letters Patent are desired:

In a transplanting machine, a frame, a movable endless chain mounted on said frame and disposed in a longitudinal vertical plane, said chain having a lower portion normally traveling rearwardly and an inclined portion normally traveling upwardly and forwardly, a pulley with a periphery of greater width than said chain about which the chain turns at the juncture of said portions, a plurality of holding units pivotally mounted on said chain and movable therewith, each unit being pivoted at its normally trailing end to said chain for swinging movement in said vertical plane about a transverse pivotal axis, and a finger rigid with each unit and disposed to one side of said chain in position to engage the periphery of said pulley as the chain turns about the pulley and moves the unit thereabout, whereby in normal operation each unit depends from said lower portion of the chain as the unit approaches the pulley and engagement of the finger with the periphery of the pulley causes said unit to swing about its pivotal axis and lie tangent to the pulley and be held in such position until clear of the pulley when the unit falls forward by gravity lengthwise onto said inclined portion of the chain.

WILLIAM S. McGOWAN.

References Cited in the file of this patent

UNITED STATES PATENTS

| Number | Name | Date |
| --- | --- | --- |
| 180,253 | McFadden | July 25, 1876 |
| 277,212 | Brimer | May 8, 1883 |
| 515,159 | Ormiston | Feb. 20, 1894 |
| 541,458 | Schroeder | June 25, 1895 |
| 1,139,292 | Jirotka | May 11, 1915 |
| 1,765,467 | Vollink | June 24, 1930 |
| 1,765,468 | Vollink | June 24, 1930 |
| 1,765,469 | Vollink | June 24, 1930 |
| 1,963,591 | Pomieraniec | June 19, 1934 |
| 2,003,390 | Poll et al. | June 4, 1935 |
| 2,026,251 | Rowton | Dec. 31, 1935 |
| 2,237,197 | Pomieraniec | Apr. 1, 1941 |

FOREIGN PATENTS

| Number | Country | Date |
| --- | --- | --- |
| 45,369 | Denmark | Mar. 14, 1932 |